(12) United States Patent
Harding et al.

(10) Patent No.: US 12,474,351 B2
(45) Date of Patent: Nov. 18, 2025

(54) MASS SPECTROMETRY CALIBRATOR (71) Applicant: The Binding Site Group Limited, Birmingham (GB)

(72) Inventors: Stephen Harding, Birmingham (GB); Gregg Wallis, Birmingham (GB)

(73) Assignee: THE BINDING SITE GROUP LIMITED, Birmingham (GB)

( * ) Notice: Subject to any disclaimer, the term of this patent is extended or adjusted under 35 U.S.C. 154(b) by 985 days.

(21) Appl. No.: 17/610,036

(22) PCT Filed: Apr. 29, 2020

(86) PCT No.: PCT/GB2020/051040
§ 371 (c)(1),
(2) Date: Nov. 9, 2021

(87) PCT Pub. No.: WO2020/229794
PCT Pub. Date: Nov. 19, 2020

(65) Prior Publication Data
US 2022/0221469 A1 Jul. 14, 2022

(30) Foreign Application Priority Data

May 10, 2019 (GB) ................................. 1906599
Jul. 26, 2019 (GB) ................................. 1910708

(51) Int. Cl.
*G01N 33/68* (2006.01)
*C07K 16/42* (2006.01)
(Continued)

(52) U.S. Cl.
CPC ..... *G01N 33/6857* (2013.01); *C07K 16/4283* (2013.01); *C07K 16/4291* (2013.01);
(Continued)

(58) Field of Classification Search
None
See application file for complete search history.

(56) References Cited

FOREIGN PATENT DOCUMENTS

| CN | 109026164 A | 12/2018 | |
|---|---|---|---|
| WO | WO-2015154052 A1 * | 10/2015 | ......... G01N 30/7266 |
| WO | WO-2017144900 A1 * | 8/2017 | ............. C07K 16/00 |

OTHER PUBLICATIONS

Barnidge et al. Using mass spectrometry to monitor monoclonal immunoglobulins in patients with a monoclonal gammopathy. J Proteome Res. Mar. 7, 2014;13(3):1419-27. (Year: 2014).*

(Continued)

*Primary Examiner* — Rebecca M Giere
*Assistant Examiner* — Alexander Alexandrovic Volkov
(74) *Attorney, Agent, or Firm* — Susan W. Gorman; INTELINK LAW GROUP, PC (57) ABSTRACT

The invention provides a method of quantifying the amount of kappa or lambda immunoglobulin light chain in a sample from a subject comprising: i. providing a sample from a subject; ii. mixing the sample with a predetermined amount of lambda light chain calibrator or kappa light chain calibrator to form a mixture; iii. performing mass spectrometry on the mixture; and iv. quantifying one or both of a) the amount of lambda light chain in the sample by comparing the relative amount of lambda light chain in the mixture as determined by the mass spectrometry to the relative amount of calibrator kappa light chain in the mixture as determined by mass spectrometry; and/or b) the amount of kappa light chain in the sample by comparing the relative amount of kappa light chain in the mixture as determined by mass spectrometry to the relative amount of calibrator lambda light chain in the mixture as determined by mass spectrometry, most typically MALDI-TOF spectrometry or liquid chromatography-mass spectrometry.

23 Claims, 9 Drawing Sheets

(51) Int. Cl.
*G01N 1/34* (2006.01)
*G01N 33/574* (2006.01)
*G01N 33/96* (2006.01)

(52) U.S. Cl.
CPC ......... *G01N 1/34* (2013.01); *G01N 33/57488* (2013.01); *G01N 33/6848* (2013.01); *G01N 33/96* (2013.01); *G01N 2458/15* (2013.01)

(56) References Cited

OTHER PUBLICATIONS

GB Search Report for Foreign Priority Application GB1906599.4, dated Feb. 3, 2020.
Machine translation of Chinese Office Action from corresponding application issued on Jun. 29, 2024.
International Search Report for corresponding PCT application, issued on Jul. 21, 2020.
"Freelite Human Kappa Free kit for use on the SPAPLUS. For in vitro diagnostic use. Produce Code: LK016.S," The Binding Site Group Ltd, Birmingham UK, Diagnostic Kit Pamphlet, 2014, pp. 1-4.
"Freelite Human Lambda Free kit for use on the SPAPLUS. For in-vitro diagnostic use. Produce Code: LK018.S," The Binding Site Group Ltd, Birmingham UK, Diagnostic Kit Pamphlet, 2014, pp. 1-4. Freelite_Human_Lambda_Free_Kit_2014.
"Hevylite Human IgA Lambda Kit for use on the SPAPLUS. For in-vitro diagnostic use. Produce Code: NK624.S," The Binding Site Group Ltd, Birmingham UK, Diagnostic Kit Pamphlet, 2011, pp. 1-8.
"Hevylite Human IgG Kappa Kit for use on the SPAPLUS. For in vitro diagnostic use. Produce Code: NK621.S," The Binding Site Group Ltd, Birmingham UK, Diagnostic Kit Pamphlet, 2014, pp. 1-2.
"Hevylite Human IgG Lambda Kit for use on the SPAPLUS. For in vitro diagnostic use. Produce Code: NK622.S," The Binding Site Group Ltd, Birmingham UK, Diagnostic Kit Pamphlet, 2014, pp. 1-2.
"Hevylite Human IgM Lambda Kit for use on the SPAPLUS. For in vitro diagnostic use. Produce Code: NK626.S," The Binding Site Group Ltd, Birmingham UK, Diagnostic Kit Pamphlet, 2014, pp. 1-2.
Hevylite Human IgA Kappa Kit use on the SPAPLUS. For in vitro diagnostic use. Produce Code: NK623.S, The Binding Site Group Ltd, Birmingham UK, Diagnostic Kit Pamphlet, 2014, pp. 1-2.
Hevylite Human IgM Kappa Kit for use on the SPAPLUS. For in vitro diagnostic use. Produce Code: NK625.S, The Binding Site Group Ltd, Birmingham UK, Diagnostic Kit Pamphlet, 2014, pp. 1-2.

* cited by examiner

| A1K02 Stock Conc. (g/L) | A1K02 Peak Intensity Ratio |
| --- | --- |
| 9.949 | 7.18 |
| 8.108 | 5.70 |
| 6.268 | 4.89 |
| 4.427 | 3.28 |
| 2.586 | 1.80 |
| 1.666 | 1.29 |
| 1.205 | 0.92 |
| 0.745 | 0.51 |
| 0.259 | 0.15 |
| 0.167 | 0.12 |
| 0.121 | 0.06 |
| 0.075 | 0.03 |
| 0.026 | 0.005 |
| 0.017 | 0.003 |
| 0.012 | 0.002 |
| 0.007 | 0.001 |

MASS SPECTROMETRY CALIBRATOR

This application is the National Stage Under 35 USC § 371 of PCT International Application No. PCT/GB2020/051040 filed on Apr. 29, 2020, which claims priority under 35 U.S.C. § 119 on Patent Application No. 1906599.4 filed in the United Kingdom on May 10, 2019, and Patent Application No. 1910708.5 filed in the United Kingdom on Jul. 26, 2019, the entire contents of each of which is hereby incorporated by reference.

The invention relates to the use of kappa light chains or lambda light chains as calibrators to allow the quantitation of the opposite lambda or kappa light chain in samples by mass spectrometry, and to kits containing such calibrators.

Antibody molecules (also known as immunoglobulins) have a twofold symmetry and typically are composed of two identical heavy chains and two identical light chains, each containing variable and constant domains. The variable domains of the heavy and light chains combine to form an antigen-binding site, so that both chains contribute to the antigen-binding specificity of the antibody molecule. The basic tetrameric structure of antibodies comprises two heavy chains covalently linked by a disulphide bond. Each heavy chain is in turn attached to a light chain, again via a disulphide bond. This produces a substantially "Y"-shaped molecule.

Heavy chains are the larger of the two types of chain found in antibodies, with typical molecular mass of 50,000-77,000 Da, compared with the smaller light chain (25,000 Da).

There are five main classes or class or classes of heavy chain which are gamma, alpha, mu, delta and epsilon which are the constituent heavy chains for: IgG, IgA, IgM, IgD and IgE respectively. IgG is the major immunoglobulin of normal human serum, accounting for 70-75% of the total immunoglobulin pool. This is the major antibody of secondary immune responses. It forms a single tetramer of two heavy chains plus two light chains.

IgM accounts for approximately 10% of the immunoglobulin pool. The molecules, together with J-chains, form a pentamer of five of the basic 4-chain structures. The individual heavy chains have a molecular weight of approximately 65,000 Da and the whole molecule has a molecular weight of about 970,000 Da. IgM is largely confined to the intravascular pool and is the predominant early antibody.

IgA represents 15-20% of human serum immunoglobulin pool. More than 80% of IgA occurs as a monomer. However, some of the IgA (secretory IgA) exists as a dimeric form.

IgD accounts for less than 1% of the total plasma immunoglobulin. IgD is found on the surface membrane of maturing B-cells.

IgE, although scarce in normal serum, is found on the surface membrane of basophils and mast-cells. It is associated with allergic diseases such as asthma and hay-fever.

In addition to the five main class or classes, there are four subclasses for IgG (IgG1, IgG2, IgG3 and IgG4). Additionally there are two subclasses for IgA (IgA1 and IgA2).

There are two types of light chain: Lambda ($\lambda$) and Kappa ($\kappa$). There are approximately twice as many $\kappa$ as $\lambda$ molecules produced in humans, but this is quite different in some mammals. Each chain contains approximately 220 amino acids in a single polypeptide chain that is folded into one constant and one variable domain. Plasma cells produce one of the five heavy chain types together with either $\kappa$ or $\lambda$ molecules. There is normally approximately 40% excess free light chain production over heavy chain synthesis. Where the light chain molecules are not bound to heavy chain molecules, they are known as "free light chain molecules". The k light chains are usually found as monomers. The A light chains tend to form dimers.

There are a number of proliferative diseases associated with antibody producing cells.

In many such proliferative diseases a plasma cell proliferates to form a monoclonal tumour of identical plasma cells. This results in production of large amounts of identical immunoglobulins and is known as a monoclonal gammopathy.

Diseases such as myeloma and primary systemic amyloidosis (AL amyloidosis) account for approximately 1.5% and 0.3% respectively of cancer deaths in the United Kingdom. Multiple myeloma is the second-most common form of haematological malignancy after non-Hodgkin lymphoma. In Caucasian populations the incidence is approximately 40 per million per year. Conventionally, the diagnosis of multiple myeloma is based on the presence of excess monoclonal plasma cells in the bone marrow, monoclonal immunoglobulins in the serum or urine and related organ or tissue impairment such as hypercalcaemia, renal insufficiency, anaemia or bone lesions. Normal plasma cell content of the bone marrow is about 1%, while in multiple myeloma the content is typically greater than 10%, frequently greater than 30%, but may be over 90%.

AL amyloidosis is a protein conformation disorder characterised by the accumulation of monoclonal free light chain fragments as amyloid deposits. Typically, these patients present with heart or renal failure but peripheral nerves and other organs may also be involved.

There are a number of other diseases which can be identified by the presence of monoclonal immunoglobulins within the blood stream, or indeed urine, of a patient. These include plasmacytoma and extramedullary plasmacytoma, a plasma cell tumour that arises outside the bone marrow and can occur in any organ. When present, the monoclonal protein is typically IgA. Multiple solitary plasmacytomas may occur with or without evidence of multiple myeloma. Waldenström's macroglobulinaemia is a low-grade lymphoproliferative disorder that is associated with the production of monoclonal IgM. There are approximately 1,500 new cases per year in the USA and 300 in the UK. Serum IgM quantification is important for both diagnosis and monitoring. B-cell non-Hodgkin lymphomas cause approximately 2.6% of all cancer deaths in the UK and monoclonal immunoglobulins have been identified in the serum of about 10-15% of patients using standard electrophoresis methods. Initial reports indicate that monoclonal free light chains can be detected in the urine of 60-70% of patients. In B-cell chronic lymphocytic leukaemia monoclonal proteins have been identified by free light chain immunoassay.

Additionally, there are so-called MGUS conditions. These are monoclonal gammopathy of undetermined significance. This term denotes the unexpected presence of a monoclonal intact immunoglobulin in individuals who have no evidence of multiple myeloma, AL amyloidosis, Waldenström's macroglobulinaemia, etc. MGUS may be found in 1% of the population over 50 years, 3% over 70 years and up to 10% over 80 years of age. Most of these are IgG- or IgM-related, although more rarely IgA-related or bi-clonal. Although most people with MGUS die from unrelated diseases, MGUS may transform into malignant monoclonal gammopathies.

In at least some cases for the diseases highlighted above, the diseases present abnormal concentrations of monoclonal immunoglobulins or free light chains. Where a disease produces the abnormal replication of a plasma cell, this often results in the production of more immunoglobulins by that type of cell as that "monoclone" multiplies and appears in the blood.

Immunofixation electrophoresis uses a precipitating antibody against the immunoglobulin molecules. Whilst this improves the sensitivity of the test it cannot be used to quantify monoclonal immunoglobulins because of the presence of the precipitating antibody. Immunofixation electrophoresis is also rather laborious to perform and interpretation may be difficult. Capillary zone electrophoresis is used in many clinical laboratories for serum protein separation and is able to detect most monoclonal immunoglobulins. However, when compared with immunofixation, capillary zone electrophoresis fails to detect monoclonal proteins in 5% of samples. These so-called "false negative" results encompass low-concentration monoclonal proteins.

Serum plasma electrophoresis (SPE) is an alternative procedure which has difficulty identifying proteins below 0.5 g/L and difficulty quantifying proteins below 10 g/L.

Total κ and λ assays have been produced. However, total κ and total λ assays are too insensitive for the detection of monoclonal immunoglobulin, free light chains or monoclonal free light chains. This is due to high background concentrations of polyclonal bound light chains which interfere with such assays.

A sensitive assay has been developed that can detect the free κ light chains and separately, the free λ light chains. This method uses a polyclonal antibody directed towards either the free κ or the free λ light chains. The possibility of raising such antibodies was also discussed as one of a number of different possible specificities, in WO 97/17372. This document discloses methods of tolerising an animal to allow it to produce desired antibodies that are more specific than prior art techniques could produce. The free light chain assay uses the antibodies to bind to free λ or free κ light chains. The concentration of the free light chains is determined by nephelometry or turbidimetry. This involves the addition of the test sample to a solution containing the appropriate antibody in a reaction vessel or cuvette. A beam of light is passed through the cuvette and as the antigen-antibody reaction proceeds, the light passing through the cuvette is scattered increasingly as insoluble immune complexes are formed. In nephelometry, the light scatter is monitored by measuring the light intensity at an angle away from the incident light, whilst in turbidimetry light scatter is monitored by measuring the decrease in intensity of the incident beam of light. A series of calibrators of known antigen (i.e. free κ or free λ) concentration are assayed initially to produce a calibration curve of measured light scatter versus antigen concentration.

This form of assay has been found to successfully detect free light chain concentrations. Furthermore, the sensitivity of the technique is very high.

The characterisation of the amount or types of free-light chains (FLC), heavy chain or subclasses, or light chain-type bound to heavy chain class or subclass, is important in a wide range of diseases including B cell diseases such as multiple myeloma and other immune mediated diseases such as nephropathy.

WO2015/154052, incorporated herein in its entirety, discloses methods of detecting immunoglobulin light chains, immunoglobulin heavy chains, or mixtures thereof, using mass spectrometry (MS). Samples comprising immunoglobulin light chains, heavy chains or mixtures thereof are immunopurified and subjected to mass spectrometry to obtain a mass spectrum of the sample. This can be used to detect monoclonal proteins in samples from patients. It can also be used to fingerprint, isotype and identify disulphide bonds in monoclonal antibodies.

MS is used to separate, for example, lambda and kappa chains in the sample by mass and charge. It may also be used to detect the heavy chain and light chain component of immunoglobulins, by, for example reducing the disulphide bonds between heavy and light chains using a reducing agent. MS is also described in WO 2015/131169, herein incorporated in its entirety.

The purification of immunoglobulins in a sample in diagnostic procedures, typically uses anti-whole antibodies, such as anti-IgG, anti-IgA, anti-IgM, anti-IgD, anti-IgE, anti-total kappa, anti-total lambda antibodies or anti-free light chain antibodies, such as anti-free κ or anti-free λ light chain antibodies. It is important to have a calibrator to ensure that the purification and detection process is carried out correctly.

WO2017/144900 describes a number of controls that utilise either heavier versions of the analyte to be detected or a monoclone of the analyte to be detected. That is, for example, IgA may be quantified in comparison to a predetermined amount of a heavier IgA kappa.

In some mass spectrometry methods, such as MALDI-TOF, proteins of interest are crystallised on a mass spectrometry target. The extent of crystallisation for any individual protein is variable across the target. In addition the properties of individual proteins means that crystallisation on the target is variable between proteins. It was therefore expected that different proteins would crystallise on the mass spectrometry target at different rates. This would mean that when the matrix is sampled by mass spectrometry, different amounts of the control protein and the analyte would be detected.

Moreover, their ionisation rates, be they for MALDI-TOF or other techniques not requiring crystallisation, such as liquid chromatography-mass spectrometry (LC-MS), were expected to be different. Mass spectrometry requires the ionisation of the target molecule. Ionisation is dependent on the properties of the individual protein. It was therefore expected that different proteins would ionise differently, leading to inconsistencies in the amount of immunoglobulin detected.

Unexpectedly the Applicant has found that kappa light chains and lambda light chains crystallise and ionise at a substantially consistent rate so that the calibration range of the lambda or kappa light chains is proportionate to the other kappa or lambda light chain crystallised on the matrix, or ionised during the mass spectrometry.

This allows the kappa light chains in a sample to be quantified using lambda light chains as a calibrator, or lambda light chains with kappa light chains as a calibrator respectively.

The invention provides a method of quantifying the amount of kappa or lambda immunoglobulin light chain in a sample from a subject comprising:
  i. providing a sample from a subject;
  ii. mixing the sample with a predetermined amount of lambda light chain calibrator or kappa light chain calibrator to form a mixture;
  iii. performing mass spectrometry on the mixture; and
  iv. quantifying one or both of
    a. the amount of lambda light chain in the sample by comparing the relative amount of lambda light chain in the mixture as determined by mass spectrometry to the relative amount of calibrator kappa light chain in the mixture as determined by mass spectrometry; and/or b. the amount of kappa light chain in the sample by comparing the relative amount of kappa light chain in the mixture as determined by mass spectrometry to the relative amount of calibrator lambda light chain in the mixture as determined by mass spectrometry.

The mass spectrometry is typically LC-MS or MALDI-TOF mass spectrometry.

The amount of kappa light chain may be the amount of polyclonal kappa light chains or monoclonal kappa light chains in the sample. The amount of the lambda light chain may be the amount of polyclonal lambda light chains or the amount of monoclonal lambda light chains in the sample. The amount may be the concentration of the polyclonal lambda or kappa light chains in the sample.

The kappa or light chains in the sample may be bound to one or more immunoglobulin heavy chains.

The lambda light chains or the kappa light chains of the calibrator prior to mixing with the sample, may be bound to one or more immunoglobulin heavy chains.

That is, the kappa or lambda light chains may be provided as, for example, IgG kappa, IgG lambda, IgA lambda, IgA kappa, IgM lambda, IgM kappa, IgD lambda, IgD kappa, IgE lambda or IgE kappa.

Alternatively, the kappa or lambda light chains in the sample may be free kappa or lambda light chains. The calibrator lambda or light chains may be free light chains. In the latter case these may be added after an immunoprecipitation step with anti-heavy chain class antibodies.

The lambda or kappa light chains in the calibrator may be monoclonal. Alternatively, they may be from polyclonal antibodies. Polyclonal antibodies are especially preferred. This is because it is expected that there will be some variation between different monoclonal antibodies in the way they ionise or crystallise. Using polyclonal antibodies is expected to reduce the noise of using individual monoclonal calibrators and produce more consistency to the methods of the invention.

The lambda light chains in the calibrator or kappa light chains in the calibrator may or may not be mass modified. They may have their molecular weight or charge increased or decreased to allow the peak in the mass spectrometry readout of the analyte to be varied compared to the equivalent kappa or lambda light chains in the sample. For example, WO 2017/144900 describes a number of ways in which to modify the molecular weight or charge of the calibrator lambda or calibrator kappa light chains, including isotopically labelling the antibodies or adding one or more amino acids to the antibodies. A monoclonal antibody may also be selected if it has, for example, a different light chain mass to the light chains of the sample.

A number of monoclonal antibodies are commercially available, such as those sold in the tradename SILu™Lite monoclonal antibodies by Sigma Aldrich, United Kingdom. These include, for example, the SILu™Lite stable-isotope universal monoclonal antibodies and also non-isotopically labelled monoclonal antibodies.

The calibrator antibodies may have their mass modified with, for example, polyethylene glycol (PEG), via a protein reactive group, such as N-hydroxysuccinamide (NHS) or maleimide (e.g. maleimide PEG 3.4 kDa). A preferred mass modifier is pentafluorophenyl polyethylene glycol (PFP-PEG), which has been found by the applicant to be especially useful as a mass modifier of immunoglobulin light chains. Another preferred mass modifier would be to use indole-butyric acid derivatives conjugated to the nucleotide binding site. Such modifiers are commercially available with different lengths to the PEG chain, for example up to 20 kDa mass.

Where the calibrator kappa light chain or calibrator lambda light chain is distinguishable from the same light chain type in the sample by mass spectrometry, the amount of calibrator light chain identified by mass spectrometry may also be used to quantify the amount of the same type of light chain in the sample. That is, lambda calibrator light chain may be used to quantify not only the kappa light chain in the sample but also the lambda light chain in the sample, and kappa light chain may be used to determine not only the lambda light chain in the sample but also the kappa light chain in the sample. They may be distinguishable because a monoclonal light chain calibrator or ones of a different mass are used to enable the m/z observed to be distinguished.

Typically the mixture is purified in at least one purification step prior to performing mass spectrometry. By having the calibrator with the mixture, this acts as an internal calibrator or "internal reference calibrator" to take into account any loss of the sample immunoglobulin during the purification or other manipulation of the sample.

The sample may be treated to remove components that could interfere with, for example, the mass spectrometry technique. For example, the sample may be centrifuged, filtered or subjected to chromatographic techniques to remove interfering components, such as from cells or cell or tissue fragments. For example, whole blood samples can be treated using conventional clotting techniques to remove red and white blood cells and platelets. For example, a plasma sample can have serum proteins precipitated using conventional reagents such as acetonitrile, KOH, NaOH, optionally followed by centrifugation of the sample. Immunoglobulins for example can be isolated from samples or enriched in a sample using standard methods. Such methods include, for example, removing one or more non-immunoglobulin contaminants from a sample. Alternatively, samples can be enriched or purified using immunopurification, centrifugation, filtration, water filtration, dialysis, ion exchange chromatography, size exclusion chromatography, protein A/G affinity chromatography, affinity purification, precipitation, gel electrophoresis, capillary electrophoresis or chemical fractionation.

Typically, the calibrator is added to the sample prior to at least one of those purification techniques as an internal reference calibrator. That is, it is included within the subject analyte sample prior to undergoing a purification or concentration of the immunoglobulins within the sample, for example by the methods described above. That is, typically before techniques are used in addition to the mass spectrometry methods used for detection of the analyte such as by LC-MS, electrospray mass spectrometry, orbitrap MS or MALDI-TOF MS. The advantage of incorporating this within the sample is that the calibrator analyte acts as an internal reference calibrator through the purification process of the sample. A known amount of the calibrator or fragment is added to the sample and this can be used as a positive internal reference calibrator that can also be used to confirm that the purification steps have been successful, or to identify where problems have occurred during the purification of the analyte in the subject sample. The use of the internal reference calibrator allows the assay to be a quantitative assay.

The sample or mixture may be immunopurified. Typically the sample is mixed with the calibrator to form a mixture prior to the immunopurification step. The calibrator may also be added after the immunopurification step.

The immunopurification step may utilise one or more of an anti-heavy chain class specific antibody, an anti-total light chain type specific antibody, an anti-free light chain type specific antibody or an anti-heavy chain class-light chain type specific antibody or fragments thereof. Such antibodies are generally known in the art.

The antibodies may be heavy chain subclass specific or light chain specific or heavy chain class-light chain type specific.

The anti-heavy chain class-light type chain specific or heavy chain subclass-light chain type specific antibodies are commercially available under the tradename Hevylite™ from The Binding Site Limited, Birmingham, United Kingdom. Such heavy chain class-light chain type specific antibodies include, for example, IgG kappa-specific antibodies and IgG lambda specific antibodies.

The antibodies or fragments may be anti-IgG specific, anti-IgA specific, anti-IgD specific, anti-IgM specific, anti-IgE specific.

Anti-total lambda specific, anti-total kappa specific, anti-free lambda specific or anti-free kappa specific antibodies may be used. The calibrator may be added after such immunopurification.

The antibodies may be anti-human specific antibodies.

The sample may be a biological sample such as blood, serum, plasma, cerebrospinal fluid or urine, more typically blood, serum or plasma.

The sample may be from a subject exhibiting hypogammaglobulinaemia or hypergammaglobulinaemia. The subject may have a proliferative disease associated with antibody producing cells, such as a monoclonal gammopathy. These include myeloma and primary systemic amyloidosis, plasmacytomas, Waldenström's macroglobulinemia, and MGUS.

A sample may be treated with a reducing agent prior to performing mass spectrometry. This is particularly useful where the light chains in the sample and indeed typically the calibrator, are bound to immunoglobulins. The use of a reducing agent decouples the light chains from the heavy chains and allows the light chains to be detected separately by the mass spectrometry.

Decoupling can be achieved by treating the total immunoglobulins with a reducing agent, such as DTT (2,3 dihydroxybutane-1,4dithiol), DTE (2,3 dihydroxybutame-1,4dithiol), thioglycolate, cysteine, sulphites, bisulfites, sulphides, bisulfides, TCEP (tris (2-carboxyethyl) phosphine), 2-mercaptoethanol, and salt forms thereof. In some embodiments, the reducing step is performed at elevated temperature, e.g. in a range from about 30° C. to about 65° C., such as about 55° C., in order to denature the proteins.

The decoupling step is usually carried out after immunopurification or other enrichment of the immunoglobulins in the sample or as part of an elution step after immunopurification of the sample.

The antibodies used in immunopurification may be intact antibodies or fragments thereof, such as Fab, F(ab) and F(ab')$^2$ fragments, or single chain antibodies.

Where the antibodies or fragments comprise light chains and heavy chains, or fragments of such chains, then they may be cross-linked to reduce the contamination of the sample by the antibody or fragment used in the immunopurification. Methods of cross-linking such antibodies are described in detail in WO 2017/144900 incorporated herein in its entirety by reference.

The method of the invention may comprise comparing the ratio of the relative amount of the lambda light chain in the sample identified by mass spectrometry to the relative amount of the calibrator kappa light chain, or the ratio of the relative amount of the kappa light chain in the sample to the relative amount of calibrator lambda light chain to allow the calculation of the amount of the lambda light chain or the kappa light chain in the sample. The ratio of the height (peak intensity) of the relative peaks of the sample light chain to the calibrator light chain may be used. Alternatively the ratio of the area of the peak (peak area) from the sample light chain to the area of the peak of the calibrator light chain may be used. The applicant has also found that accuracy is improved by comparing the ratio of area of peak of the lambda or kappa from the sample to the combined area of the lambda or kappa from the sample plus the area from the calibrator kappa or lambda peaks.

The relative ratio between the sample and the calibrator may be identified by producing a calibrator curve of the amount of kappa versus lambda light chains via the mass spectrometry method using known amounts of the light chains.

The ratio of kappa to lambda light chains in the sample may be determined.

The invention also provides a computer comprising machine readable medium adapted to receive a first signal indicating an amount of kappa light chain in a sample, or an amount of lambda light chain in a sample, and a second signal indicating an amount of lambda light chain calibrator or kappa light chain calibrator obtained by a method according to the invention, and comparing the two signals to a predetermined calibration factor to indicate the amount of kappa light chain or lambda light chain in the sample. The calibration factor may be previously obtained using a calibration curve.

Kits for use in the invention comprising one or more of:
(a) an anti-IgG specific antibody and a predetermined amount of IgG kappa or IgG lambda immunoglobulin;
(b) an anti-IgA specific antibody and a predetermined amount of IgA kappa or IgA lambda immunoglobulin;
(c) an anti-IgM specific antibody and a predetermined amount of IgM kappa or IgM lambda immunoglobulin;
(d) an anti-IgD specific antibody and a predetermined amount of IgD kappa or IgD lambda immunoglobulin; or
(e) an anti-IgE specific antibody and a predetermined amount of IgE kappa or IgE lambda immunoglobulin;

The kit and method of the invention may also comprise the use of or the presence in the kit of standard human serum, for example DA470K. This is standardised human serum made to ERM standard DA470ĸ and may be used as a calibrant. It contains a mixture of alpha1 macroglobulin, alpha1 acid glycoprotein, alpha1 antitrypsin, albumin, beta2-microglobulin, complement proteins C3c and C4, haptoglobulin, Immunoglobulins IgA, IgG and IgM, transferrin and transthyretin.

The invention also provides a method of quantifying the amount of a heavy chain in a sample comprising providing a sample from a subject, isolating immunoglobulins from the sample by immunopurifying with anti-total kappa or anti-total lambda antibodies, and adding IgM heavy chains as a calibrator, prior to performing mass spectrometry and quantifying the amount of IgG in the sample as determined by mass spectrometry.

In this case the antibodies purify heavy chains bound to lambda or kappa light chains. IgM is used as the calibrator because it is glycosylated and so has a different m/z value so can be used as the calibrator.

The mass spectrometry and other components of the method may be as described above.

The invention will now be described by way of example only with reference to the following figures.

In each of these examples an internal reference (or calibrator) protein is added at a fixed concentration to different concentrations of the analyte. Each sample was subjected to substrate-specific immunoprecipitation with paramagnetic beads coated with polyclonal anti-IgG, or anti IgA. After separation of the light from the heavy chain, light chain mass spectra were acquired using a MALDI-TOF mass spectrometer. Either the peak signal intensity or peak area was determined for each combination and this was then plotted against the concentration of the analyte (sample).

Figure 1A:
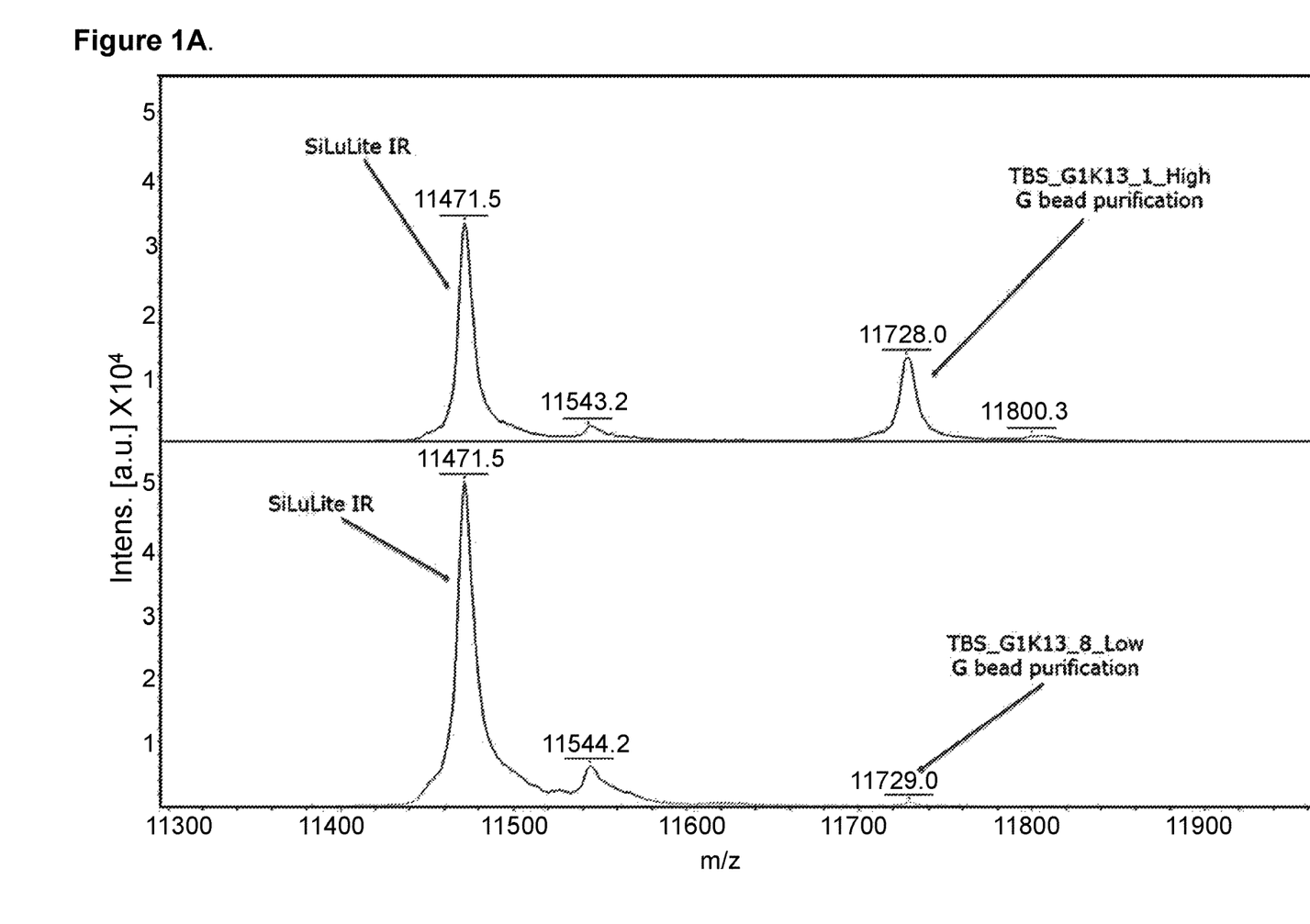
FIG. 1A shows SiLuLite IgG1 lambda added as an internal reference (calibrator) on the same MALDI mass spectrum with a sample from a patient with IgG kappa multiple myeloma.
Figure 1B:
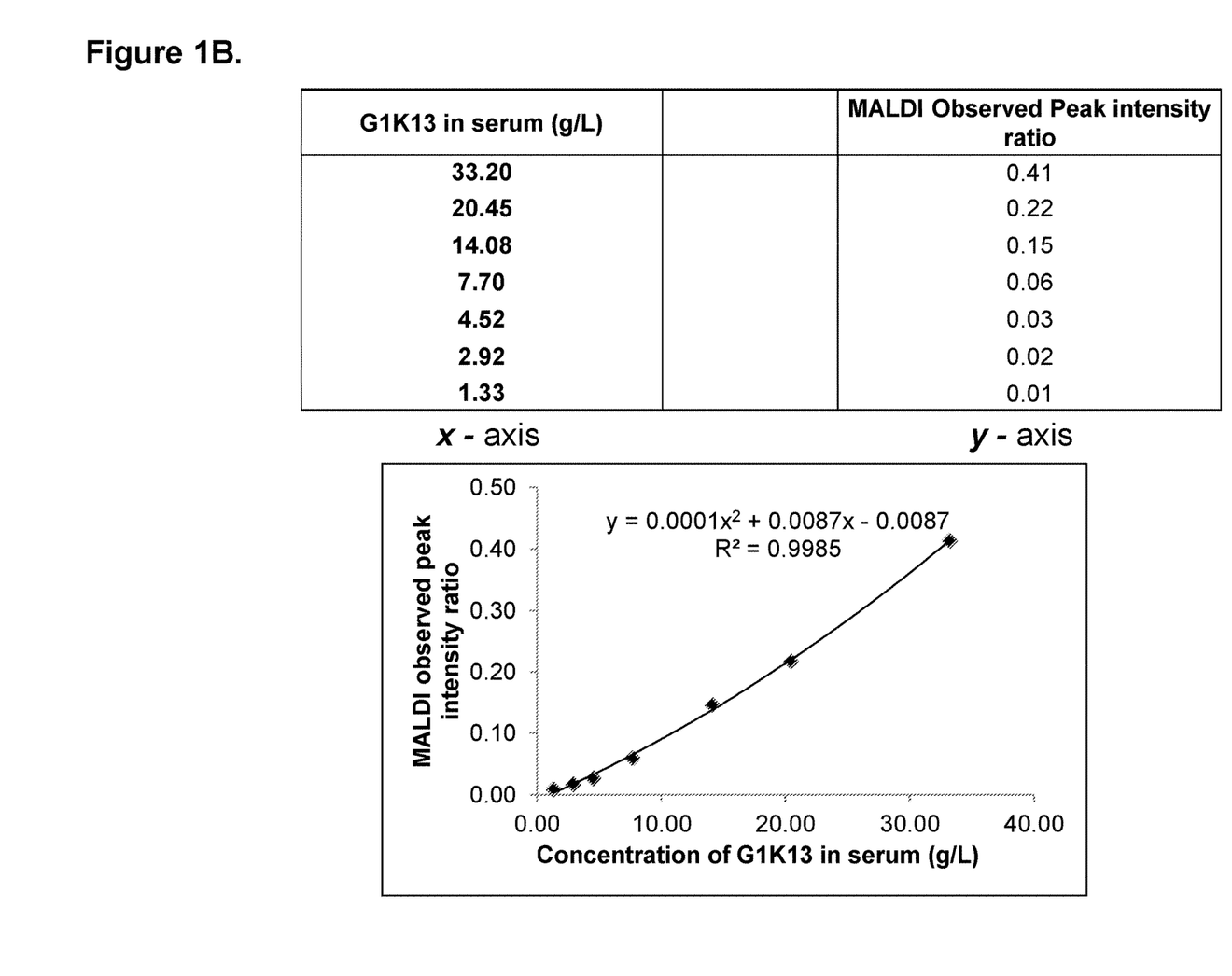
FIG. 1B shows the relationship between the MALDI peak intensity ratio of the calibrator to sample versus the IgG1 kappa concentration.
Figure 2A:
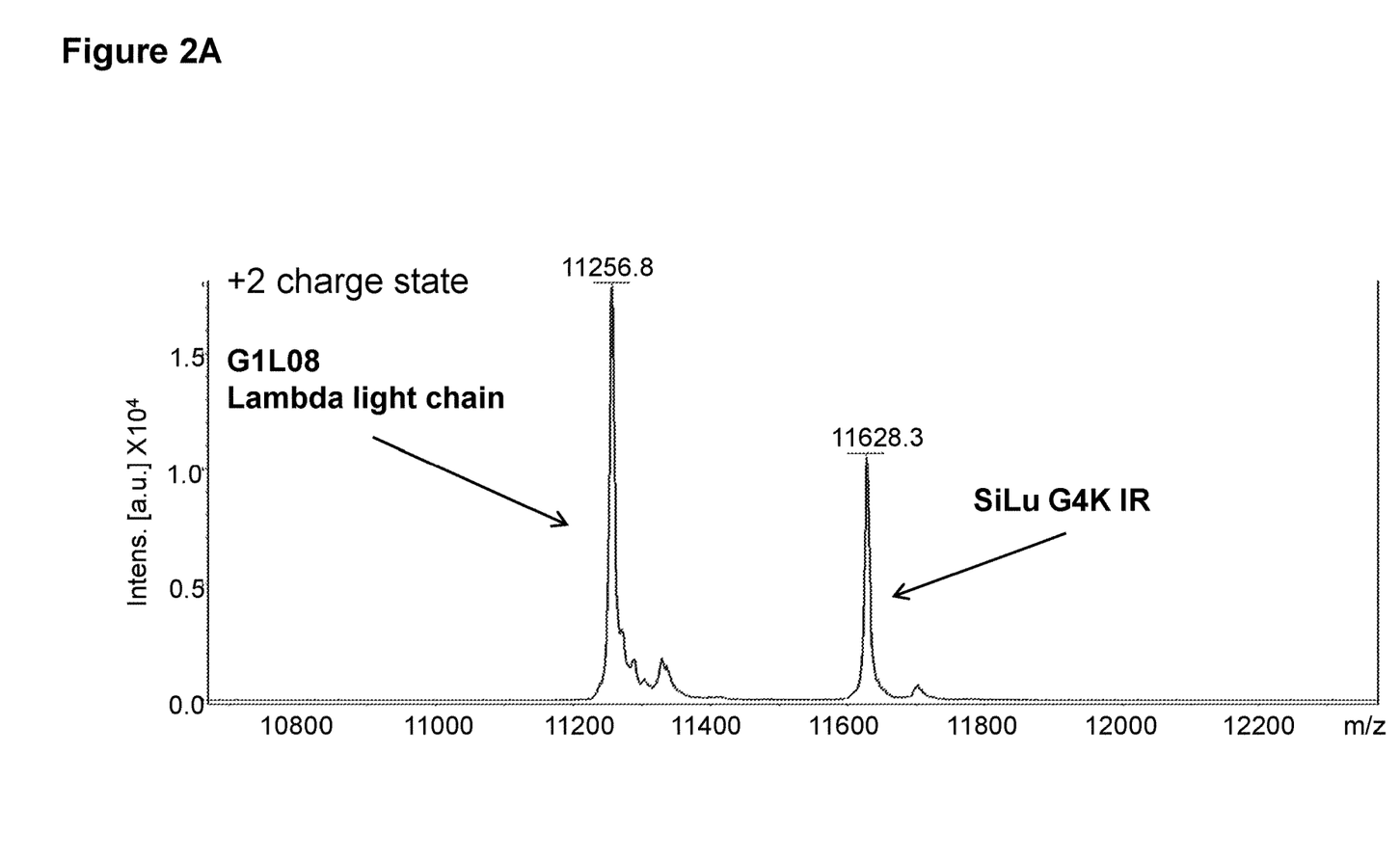
FIG. 2A shows SiLuLite IgG4 kappa added as an internal reference (calibrator) on the same MALDI mass spectrum with a sample from a patient with IgG lambda multiple myeloma.
Figure 2B:
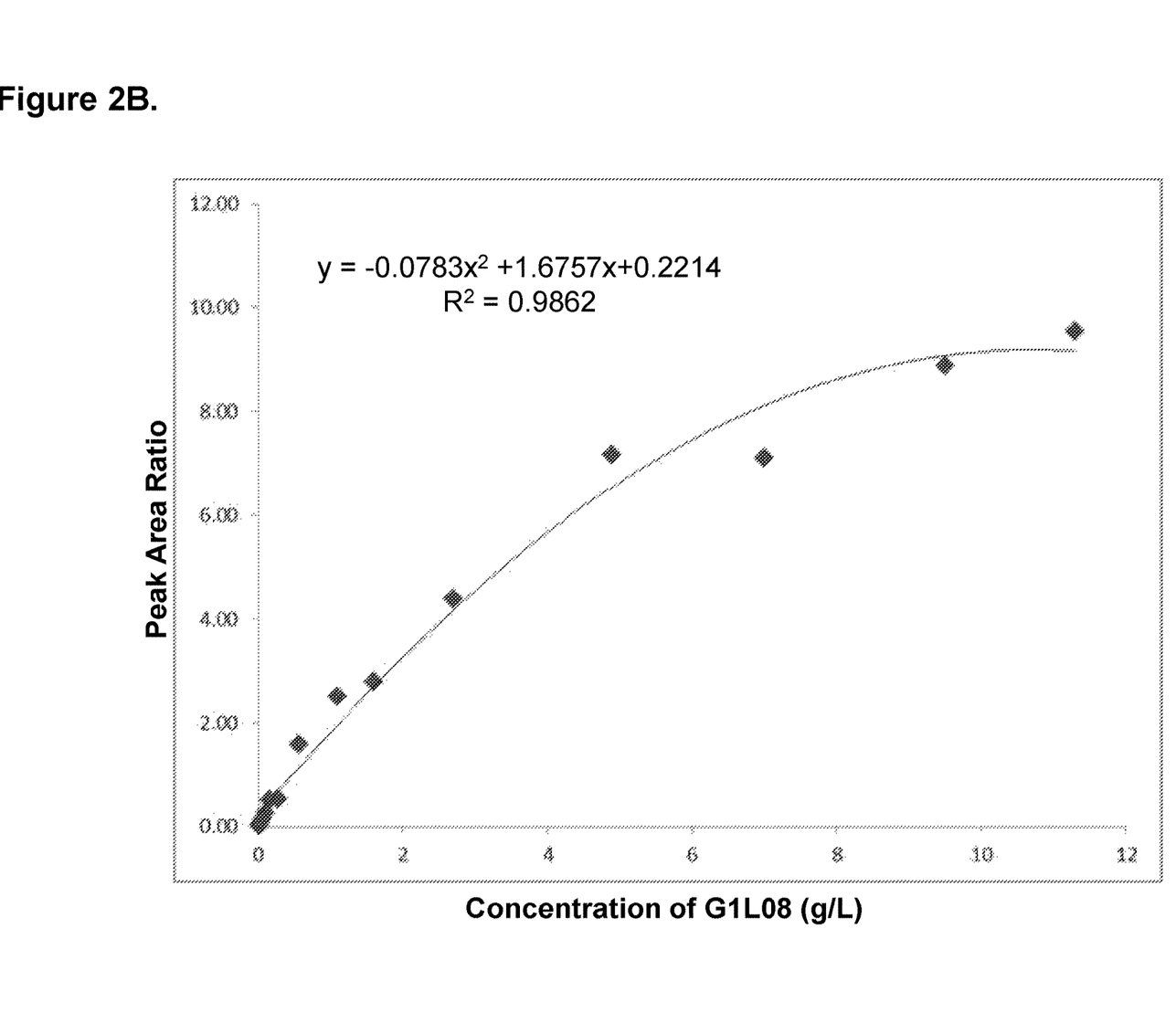
FIG. 2B shows the relationship between the MALDI peak intensity ratio of the calibrator to sample versus the IgG1 lambda concentration.

Commercially available and mass defined SiLu™ Lite IgG1 Lambda was used as an internal reference and a G1K13 M-spike (IgG1 kappa) as the sample. The two light chain m/z peaks are clearly separated on the mass spectrum from each other (FIG. 1A) and a strong correlation observed between the peak intensity ratio and the concentration of the monoclonal protein sample (FIG. 1B). Where the peak intensity ratio is the ratio between the peak intensity of the lambda light chains of the reference calibrator material and the peak intensity of the kappa light chains from the IgG kappa monoclonal protein in the sample. Similarly a commercially available SiLu™ Lite IgG4 Kappa from Sigma was used as the Internal Reference calibrator and the analyte sample was a G1L08 M-spike (IgG1 lambda), with very similar results (FIGS. 2A and B). These results have shown that a monoclonal IgG of either kappa or lambda light chain can be used as a calibrator against another monoclonal IgG of opposite light chain by MALDI-TOF MS.

To test whether the intensity peak areas are constant between kappa light chains and lambda lights chains, equal amounts of purified polyclonal IgG kappa and polyclonal IgG lambda were mixed together and diluted. The diluted samples were then immunoprecipitated using anti-IgG antibodies immobilized on beads and reduced to separate the kappa and lambda light chains from the IgG heavy chains, prior to spotting on a MALDI target plate. The plate was then subject to mass spectrometry and the polyclonal light chain peak areas for the kappa and lambda light chains determined and plotted as a function of concentration (Table below and FIG. 3). The results show that the peak area (kappa to lambda) ratios are constant throughout the 10 fold concentration range (7.44 to 0.74 g/L), and are not overtly affected by ionisation or differential binding to the anti-IgG antibodies on the beads.

Figure 3:
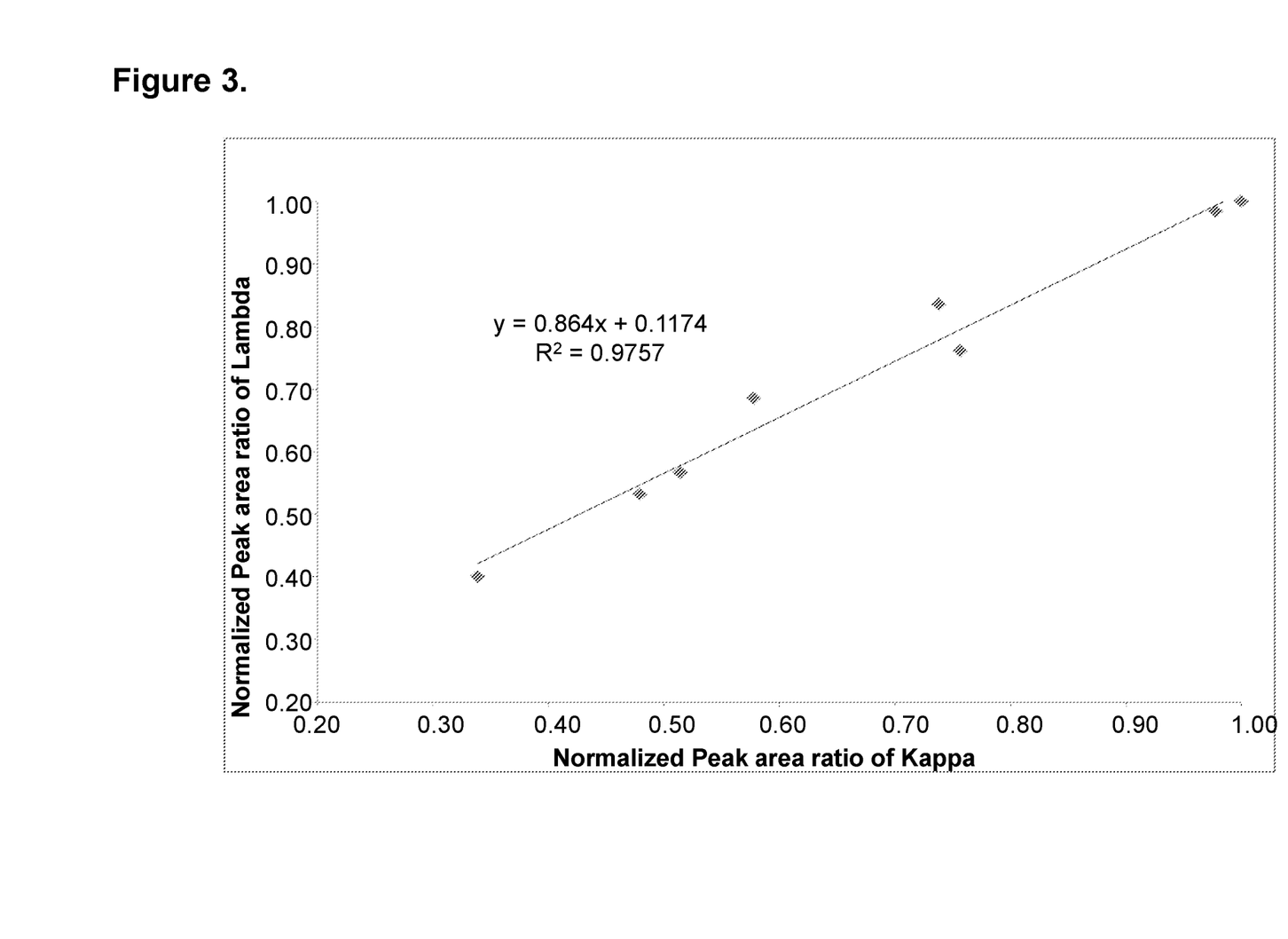
FIG. 3 shows the peak area ratios for equal amounts of purified polyclonal IgG kappa and IgG lambda mixed together prior to immunoprecipitation and MALDI-TOF analysis.

| Conc. | Kappa/Lambda | | |
|---|---|---|---|
| (g/L) | Average | ST DEV | % CV |
| 7.44 | 1.81 | 0.05 | 3.0 |
| 5.76 | 1.81 | 0.05 | 2.6 |
| 4.09 | 1.80 | 0.08 | 4.3 |
| 2.42 | 1.63 | 0.05 | 3.2 |
| 1.41 | 1.59 | 0.06 | 4.0 |
| 1.08 | 1.60 | 0.12 | 7.2 |
| 0.91 | 1.48 | 0.12 | 8.4 |
| 0.74 | 1.41 | 0.15 | 10.7 |

Figure 4A:
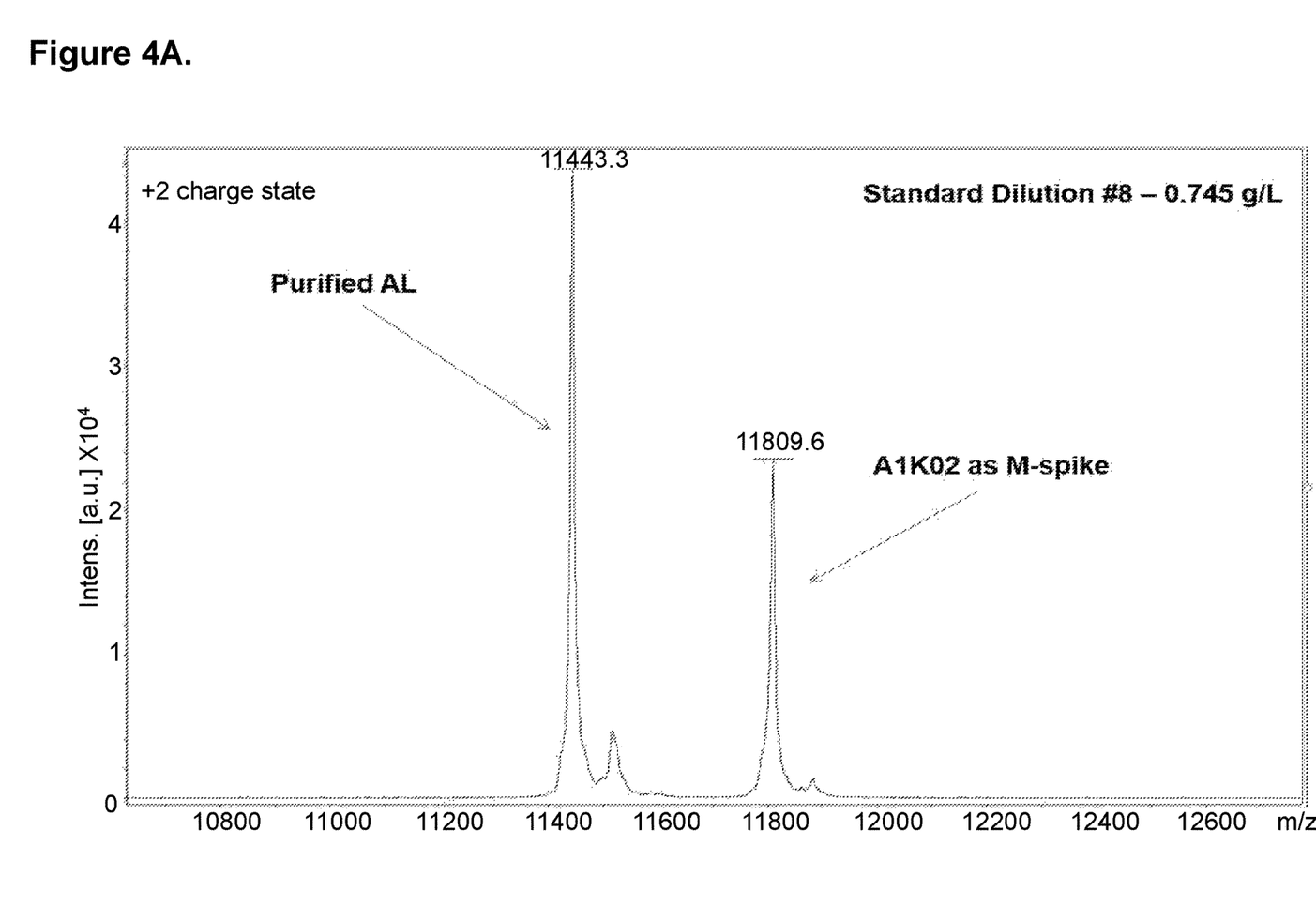
FIG. 4A shows purified monoclonal IgA lambda added as an internal reference (calibrator) on the same MALDI mass spectrum with a sample from a patient with IgA1 kappa multiple myeloma.
Figure 4B:
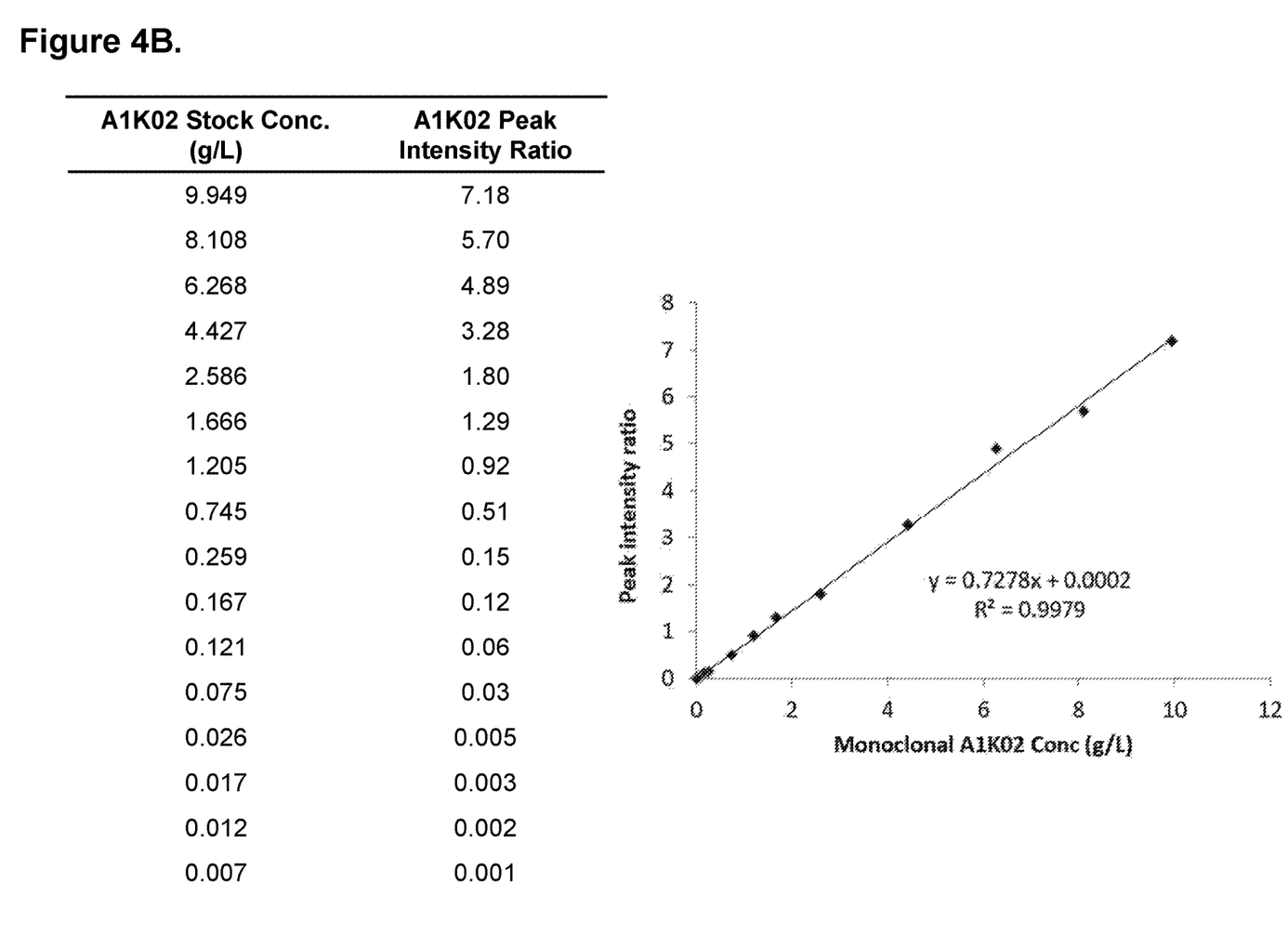
FIG. 4B shows the relationship between the MALDI peak intensity ratio of the calibrator to sample versus the IgA1 kappa concentration.

In order to demonstrate that the effect is not heavy chain class specific a monoclonal IgA1kappa antibody was used as an internal reference and an IgA lambda as the sample. The two light chain m/z peaks are again clearly separated on the mass spectrum from each other (FIG. 4A) and a strong correlation observed between the peak intensity ratio and the concentration of the monoclonal protein sample (FIG. 4B). This shows that the ability to use lambda or kappa as a calibrator is not heavy chain class specific.

Figure 5:
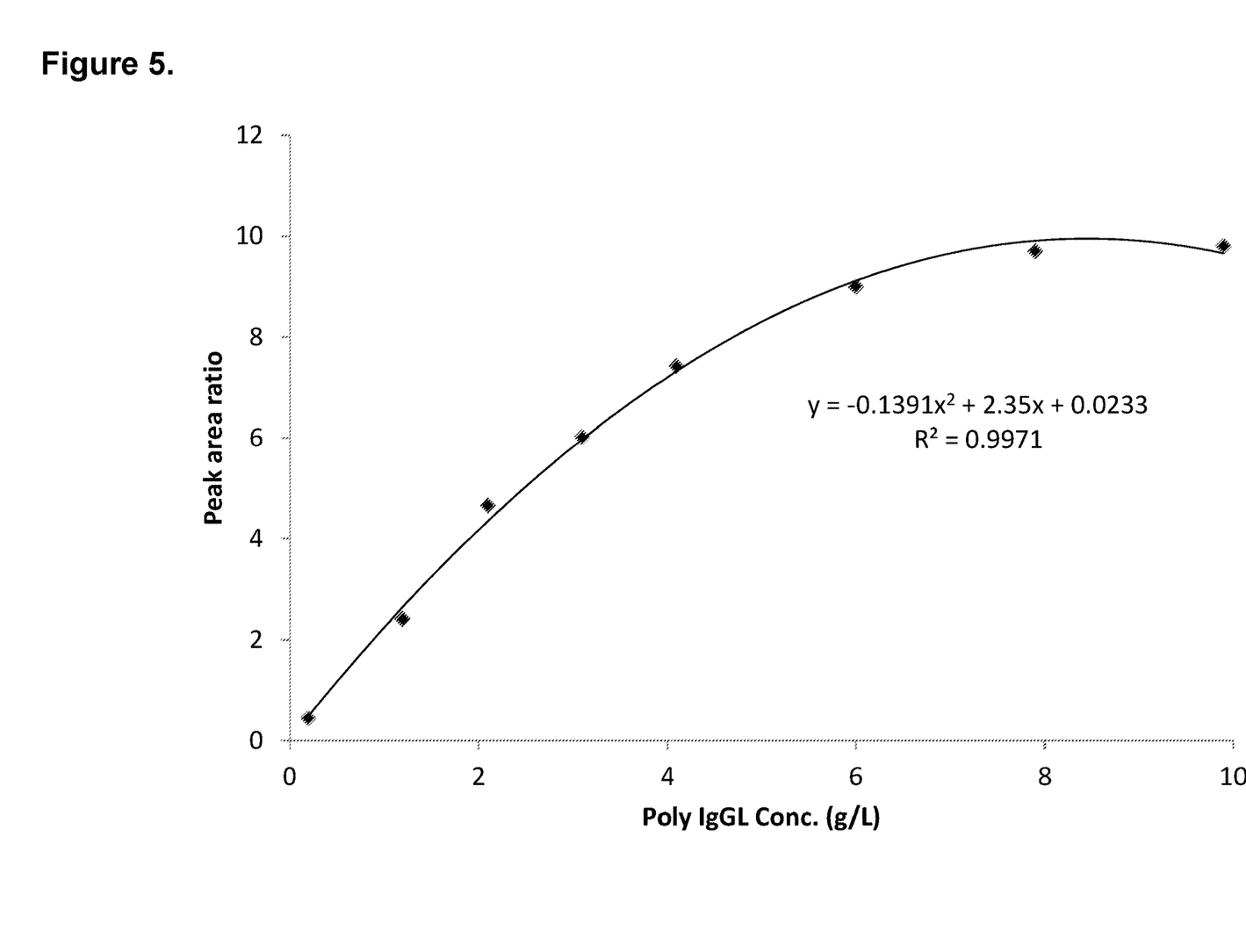
FIG. 5 shows the relationship between the MALDI-TOF peak area ratio of polyclonal IgG kappa (calibrator) mixed with polyclonal IgG lambda as the analyte.

Use of polyclonal light chains as an internal reference for the opposite polyclonal light chain is shown in FIG. 5. This example used polyclonal IgG kappa as the calibrator or internal reference with poly IgG lambda as the analyte. The peak area ratios obtained for the calibrator and sample in the sample concentration range of 9.9 to 0.2 g/L are shown in the table below and plotted in FIG. 5.

| Poly GL conc. g/L | Peak area ratio |
|---|---|
| 9.9 | 9.8 |
| 7.9 | 9.7 |
| 6.0 | 9.0 |
| 4.1 | 7.42 |
| 3.1 | 6.02 |
| 2.1 | 4.66 |
| 1.2 | 2.41 |
| 0.2 | 0.44 |

Figure 6:
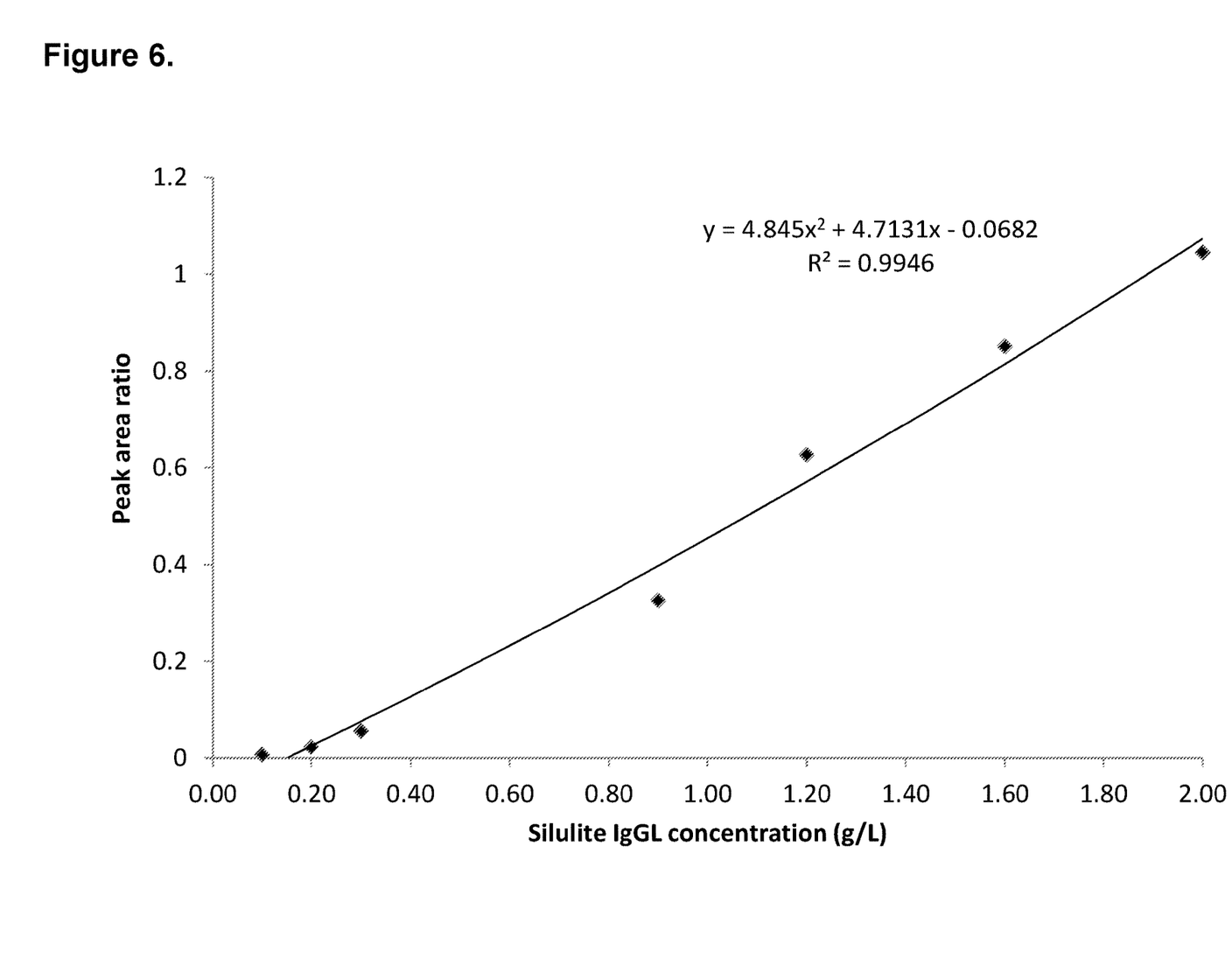
FIG. 6 shows the use of polyclonal IgG kappa as the calibrator with monoclonal SiLuLite IgG lambda as the analyte in the range 0-2 g/L.

FIG. 6 confirms the ability to use polyclonal light chains as a calibrator for monoclonal light chains as the analyte. Purified polyclonal IgG kappa was used as an internal reference at 0.5 g/L and mixed with SiLuLite IgG lambda monoclonal protein in the range 2.0 to 0.1 g/L. The peak area ratios obtained for the calibrator and sample are shown in the table below and plotted against sample concentration in FIG. 6.

These examples have shown that different combinations of immunoglobulin kappa or lambda containing molecules can be used as internal reference or calibrator molecules against other immunoglobulins of opposite light chain in MALD-TOF MS. This utility is valid for both monoclonal and polyclonal proteins.

| SiLuLite IgG g/L | Peak Area Ratio |
|---|---|
| 2.0 | 1.045 |
| 1.6 | 0.851 |
| 1.2 | 0.626 |
| 0.8 | 0.326 |
| 0.3 | 0.055 |
| 0.2 | 0.022 |
| 0.1 | 0.007 |

The invention claimed is:

1. A method of quantifying the amount of kappa or lambda immunoglobulin light chain in a sample from a subject comprising:
   i. providing a sample from a subject containing kappa light chain analyte and/or lambda light chain analyte;
   ii. mixing the sample with a predetermined amount of calibrator lambda light chain or calibrator kappa light chain to form a mixture of analyte light chains and calibrator light chains;
   iii. performing mass spectrometry on the mixture; and
   iv. quantifying:
      a) the amount of the lambda light chain analyte in the mixture by comparing the signal from the lambda light chain analyte in the mixture as determined by the mass spectrometry to the signal from the calibrator kappa light chain in the mixture as determined by mass spectrometry; or
      b) the amount of the kappa light chain in the mixture by comparing the signal from the kappa light chain analyte in the mixture as determined by mass spectrometry to the signal from the calibrator lambda light chain in the mixture as determined by mass spectrometry.

2. The method according to claim 1 wherein the calibrator is polyclonal lambda light chains or polyclonal kappa light chains.

3. The method according to claim 1 wherein the calibrator is monoclonal kappa light chains or monoclonal lambda light chains.

4. The method according to claim 1, wherein the kappa or lambda light chain analyte is bound to one or more immunoglobulin heavy chains.

5. The method according to claim 1, wherein the calibrator lambda light chains or the calibrator kappa light chains are bound to one or more immunoglobulin heavy chains prior to mixing.

6. The method according to claim 1, wherein the kappa light chain analyte or lambda light chain analyte in the sample is free kappa or lambda light chain analyse.

7. The method according to claim 1, wherein the calibrator lambda light chains or calibrator kappa light chains are free light chains.

8. The method according to claim 1, wherein the calibrator lambda light chains or calibrator kappa light chains are mass modified.

9. The method according to claim 8 wherein the calibrator lambda light chains or calibrator kappa light chains have one or more additional amino acids compared to the lambda light chain analyte or kappa light chain analyte in the mixture, or wherein the calibrator lambda light chains or calibrator kappa light chains are attached to polyethylene glycol.

10. The method according to claim 1, wherein the sample or mixture is immunopurified with an anti-heavy chain class specific antibody, or fragment thereof, and wherein the antibody is anti-IgG specific, anti-IgA specific, anti-IgD specific, anti-IgM specific or anti-IgE specific.

11. The method according to claim 1, wherein the sample is selected from blood, serum, plasma, cerebrospinal fluid, and urine.

12. The method according to claim 1, comprising treating the sample or mixture with a reducing agent prior to performing mass spectrometry.

13. The method according to claim 1, wherein the amount of the lambda light chain analyte in the mixture is determined by first determining the peak area for the lambda light chain analyte and the peak area for the calibrator kappa light chain and then determining the peak area ratio, wherein the peak area ratio is:
   (i) the ratio of the peak area from the lambda light chain analyte to the peak area of the calibrator kappa light chain; or
   (ii) the ratio of the peak area from the calibrator kappa light chain to the peak area from the lambda light chain analyte; or
   (iii) the ratio of the peak area from the lambda light chain analyte to the combined area of the peak from the lambda light chain analyte and the calibrator kappa light chain; or
   (iv) the ratio of the combined area of the peak from the lambda light chain analyte and the calibrator kappa light chain to the peak area from the lambda light chain analyte.

14. The method according to claim 1, wherein the calibrator kappa light chain or calibrator lambda light chain is distinguishable from the same light chain type in the sample by mass spectrometry, and the amount of the calibrator light chain identified by mass spectrometry is further used to quantify the amount of the same type of light chain in the mixture.

15. The method according to claim 1, wherein the ratio of the amounts of kappa to lambda light chain analytes in the mixture is determined.

16. The method according to claim 1, wherein the subject has a B cell proliferative disease.

17. A computer, comprising machine readable medium adapted to:
   receive a first signal indicating an amount of kappa light chain analyte in a sample, or an amount of lambda light chain analyte in a sample, and a second signal indicating an amount of calibrator lambda light chain or calibrator kappa light chain obtained by the method according to claim 1; and
   compare a ratio of the first and second signals to the predetermined amount of calibrator lambda light chain or calibrator kappa light chain, to indicate the amount of the kappa light chain analyte or lambda light chain analyte in the mixture.

18. A kit for use in the method according to claim 1, comprising an antibody selected from:
   (a) an anti-IgG specific antibody and a predetermined amount of IgG kappa or IgG lambda immunoglobulin;
   (b) an anti-IgA specific antibody and a predetermined amount of IgA kappa or IgA lambda immunoglobulin;
   (c) an anti-IgM specific antibody and a predetermined amount of IgM kappa or IgM lambda immunoglobulin;
   (d) an anti-IgD specific antibody and a predetermined amount of IgD kappa or IgD lambda immunoglobulin; or
   (e) an anti-IgE specific antibody and a predetermined amount of IgE kappa or IgE lambda immunoglobulin.

19. The method according to claim 16, wherein the B cell proliferative disease is a monoclonal gammopathy disease.

20. The method according to claim 1, wherein the mass spectrometry is MALDI-TOF spectrometry, or liquid chromatography-mass spectrometry.

21. The method according to claim 17, wherein the first and second signals are the peak intensity or the peak area from the analyte and the calibrator.

22. The method according to claim 1, wherein the amount of the lambda light chain analyte in the mixture or the amount of kappa light chain analyte in the mixture is determined by comparing the peak intensity ratio, wherein the peak intensity ratio is:
   (i) the peak intensity from the lambda light chain analyte to the peak intensity from the calibrator kappa light chain, or the peak intensity from the kappa light chain calibrator to the peak intensity of the lambda light chain; or
   (ii) the peak intensity from the kappa light chain analyte to the peak intensity from the calibrator lambda light chain, or the peak intensity from the calibrator lambda light chain to the peak intensity from the kappa light chain analyte.

23. The method according to claim 1, wherein the amount of kappa light chain analyte in the mixture is determined by first determining the peak area for kappa light chain analyte and peak area for calibrator lambda light chain and then determining the peak area ratio, wherein the peak area ratio is:
   (i) the ratio of the peak area from the kappa light chain analyte to the peak area of the calibrator lambda light chain; or
   (ii) the ratio of the peak area from the calibrator lambda light chain to the peak area from the kappa light chain analyte; or
   (iii) the ratio of the peak area from the kappa light chain analyte to the combined area of the peak from the kappa light chain analyte and calibrator lambda light chain; or
   (iv) the ratio of the combined area of the peak from the kappa light chain analyte and calibrator lambda light chain to the peak area from the kappa light chain analyte.

* * * * *